(12) United States Patent
Rustogi et al.

(10) Patent No.: US 11,343,638 B2
(45) Date of Patent: May 24, 2022

(54) SYSTEM AND METHOD FOR VALIDATING ACCURACY OF GEOGRAPHIC LOCATION FOR AN ADDRESS

(71) Applicant: Delhivery Private Limited, Haryana (IN)

(72) Inventors: Kabir Rustogi, New Delhi (IN); Rahul Kumar, Haryana (IN); Ankit Soni, Rajasthan (IN)

(73) Assignee: Delhivery Private Limited, Gurgaon (IN)

( * ) Notice: Subject to any disclaimer, the term of this patent is extended or adjusted under 35 U.S.C. 154(b) by 0 days.

(21) Appl. No.: 17/064,673

(22) Filed: Oct. 7, 2020

(65) Prior Publication Data

US 2021/0289315 A1 Sep. 16, 2021

(30) Foreign Application Priority Data

Mar. 16, 2020 (IN) .............................. 202011011138

(51) Int. Cl.
*H04W 4/021* (2018.01)
*G06T 17/05* (2011.01)
*G06N 5/00* (2006.01)
*H04W 4/029* (2018.01)

(52) U.S. Cl.
CPC ............ *H04W 4/021* (2013.01); *G06N 5/003* (2013.01); *G06T 17/05* (2013.01); *H04W 4/029* (2018.02)

(58) Field of Classification Search
CPC ... H04W 4/021; H04W 4/0219; H04W 4/029; H04W 4/023; G06N 5/003; G06T 17/05
See application file for complete search history.

(56) References Cited

U.S. PATENT DOCUMENTS

| | | | |
|---|---|---|---|
| 6,101,496 A * | 8/2000 | Esposito | G01C 21/32 701/532 |
| 2007/0296630 A1* | 12/2007 | Schwerin | G09B 29/106 342/357.46 |
| 2015/0081579 A1* | 3/2015 | Brown | H04W 4/029 705/325 |

\* cited by examiner

*Primary Examiner* — Brandon J Miller
(74) *Attorney, Agent, or Firm* — Tatonetti IP

(57) ABSTRACT

A system and method of validating the accuracy of geographic location for an address is provided, as described in the embodiments. The system checks whether a given geographical location is the correct physical location for an address or not. An address whose location needs to be verified is parsed and broken down into at least one of nationality, state, city, town, locality, sub-locality, street, landmark, building, floor number, identification number, postal code, zip code or any other address identifying parameter. Similar addresses are searched for in the list of stored addresses and the verification check is done based on locations of the addresses found to be similar. In this way, the system establishes a trust score between the address and the geographic location of an entity.

10 Claims, 4 Drawing Sheets

Selecting a first address data and a first location data for a first entity

Identifying a plurality of hierarchical addressing blocks from the first address data of the first entity

Selecting at least one hierarchical addressing block from the data storage module

Selecting at least one second entity from the list of entities corresponding to the selected addressing block

Retrieving a second location data corresponding to a location of the selected second entity from the data storage module

Calculating a correlation between the second location data corresponding to the location of the selected second entity and the first location data corresponding to the location of the first entity

Computing a verification score based on the correlation calculated between the first location data and the second location data

Updating the verification score for the first entity in the data storage module

Fig. 4

SYSTEM AND METHOD FOR VALIDATING ACCURACY OF GEOGRAPHIC LOCATION FOR AN ADDRESS

CROSS-REFERENCE TO RELATED APPLICATIONS

This non-provisional patent applications claims the benefit of and priority to Indian Patent Application Serial No. 202011011138, filed Mar. 16, 2020, entitled "System and Method for Validating Accuracy of Geographic Location for an Address," the entire contents of which is hereby incorporated herein by reference.

FIELD OF INVENTION

Embodiments of the disclosure relate generally to the field of machine learning and data interpretation. More particularly, embodiments of the disclosure relate to a system, method and apparatus for validating geographic locations for an address.

BACKGROUND

A geographical co-ordinate is an indicator of geographical location associated with an entity such as a building, structure, open-area, or other geographical region. Such entities are often also identified by a street address, postal codes, zip codes etc, or their combination. Geocoding is the process that associates a specific geographical location, such as a pair of latitude-longitude co-ordinates, with the street address or other address identifier of the entity. Geographical co-ordinates help in enhancing our understanding of geographic relationships between entities. Such understanding of geographic relationships is critical in many areas, including telecommunications, postal delivery, route planning, parcel delivery etc.

Various methods exist for generating highly accurate geographical co-ordinates. For example, entities can be individually surveyed with GPS receivers and the address for each entity may be mapped with the geographical location data received by the GPS receiver. Such approach, however, is very expensive and time-consuming to implement on a large scale. Accordingly, less expensive and more efficient geocoding methods have been developed. These approaches, however, often produce inaccurate geographical co-ordinates. For example, a conventional technique may employ address interpolation to estimate geographical co-ordinates of addresses. In one example, the address interpolation technique may calculate the geographical co-ordinates of entities along an entire street segment using knowledge of geographical co-ordinates for just the endpoints of the street segment. Various drawbacks occur in such system as address interpolation assumes that the street segments are relatively straight, have uniformly spaced street addresses, have buildings of fairly uniform size and are set back a fairly uniform distance back from the street.

Provided these assumptions are satisfied, address interpolation can accurately estimate geographical co-ordinates for addresses along each street segment from the segment's endpoint information by linear interpolation. Unfortunately, the above assumptions often fail, and the resulting geographical co-ordinates are inaccurate.

Postal codes and zip codes are another way of assigning location co-ordinates to a group of entities. However, in some regions, the area covered under a postal code may not be completely bounded by streets, or such area may not have an easily identifiable boundary. In such cases, existing geocoding methods may provide inaccurate results.

Hence, there is a need for a system and method of validating accuracy of geographical locations for entities.

BRIEF DESCRIPTION OF THE DRAWINGS

Embodiments according to the claimed subject matter are described below with reference to the drawings. The detailed description references the accompanying figures. The same numbers can be used throughout the drawings to reference like features and components. As used herein, like terms refer to like elements throughout the description. It should be noted that views of exemplary embodiments are merely to illustrate selected features of the embodiment. The views qualitatively illustrate exemplary features of some embodiments and, therefore, should not be interpreted as being drawn to scale.

FIG. 4 illustrates an address-location verifying system, according to one embodiment of the present invention.

SUMMARY

Figure 1:
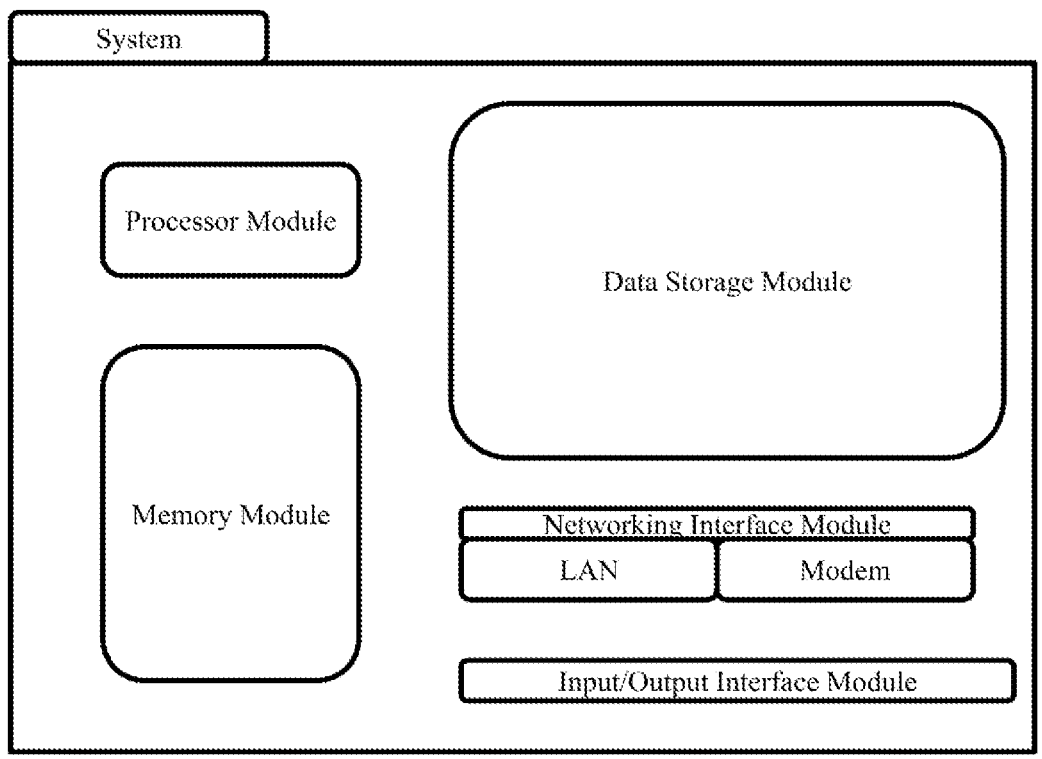
FIG. 1 is a block diagram schematically showing a system according to some embodiments of the present invention.

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

It is an object of the invention to provide improved methods for verifying geographic locations of addressable entities.

According to one aspect of the present invention, there is disclosed a computer system including one or more processing modules. The computer system further comprises one or more data storage modules operably coupled to the one or more processing modules. The computer system also comprises at least one memory module operably coupled to the one or more processing modules. The processing modules may be configured to select an address data corresponding to an address of a first entity and a location data corresponding to a location of the first entity; select a location data corresponding to a location of a second entity; compute a first correlation between the location data corresponding to a location of the first entity and the location data corresponding to a location of the second entity; and update a verification score corresponding to a correlation between address data and location data of the first entity.

The independent claims define the invention in various aspects. The dependent claims state selected elements of embodiments according to the invention in various aspects.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

DETAILED DESCRIPTION

For purposes of explanation, numerous specific details are set forth in order to provide a thorough understanding of the claimed subject matter. It may be evident, however, that the claimed subject matter may be practised without these specific details. Also, in some instances, well-known features are omitted or simplified to clarify the description of the exemplary implementations. In some other instances, well-known features or units or circuits have been shown in block diagram form in order avoid clutter due to unnecessary detailing. Reference will now be made to the drawings to describe the present invention in detail. The implementations herein are described in terms of exemplary embodiments. However, it should be appreciated that individual aspects of the implementations may be separately claimed and one or more of the features of the various embodiments may be combined.

FIG. 1 is a block diagram schematically showing a system according to some embodiments of the present invention. As shown, the system may comprise at least one processing module, at least one data storage module operably coupled to the at least one processing module and at least one memory module operably coupled to the at least one processing module. The system may further include a networking interface, allowing the system to operate in a networked environment supporting connections to one or more remote computers, such as mobile devices and computing devices. The networking interface may include a modem and a local area network (LAN) interface. The modem and LAN interface may connect to external communication devices, such as mobile phone, computer system and laptops etc. via internet, WAN or other communication modes.

The memory module may be configured to store software used by the system such as an operating system, applications program and associated database. The memory module may further be configured to store instructions, executable by the processing module, for enabling the system to perform various functions.

The system may also include an input-output interface which may include, but not limited to, an interface for display, keyboard, mouse, keypad, speaker, haptic device, microphone, camera or other input-output techniques well known in the art.

Figure 2:
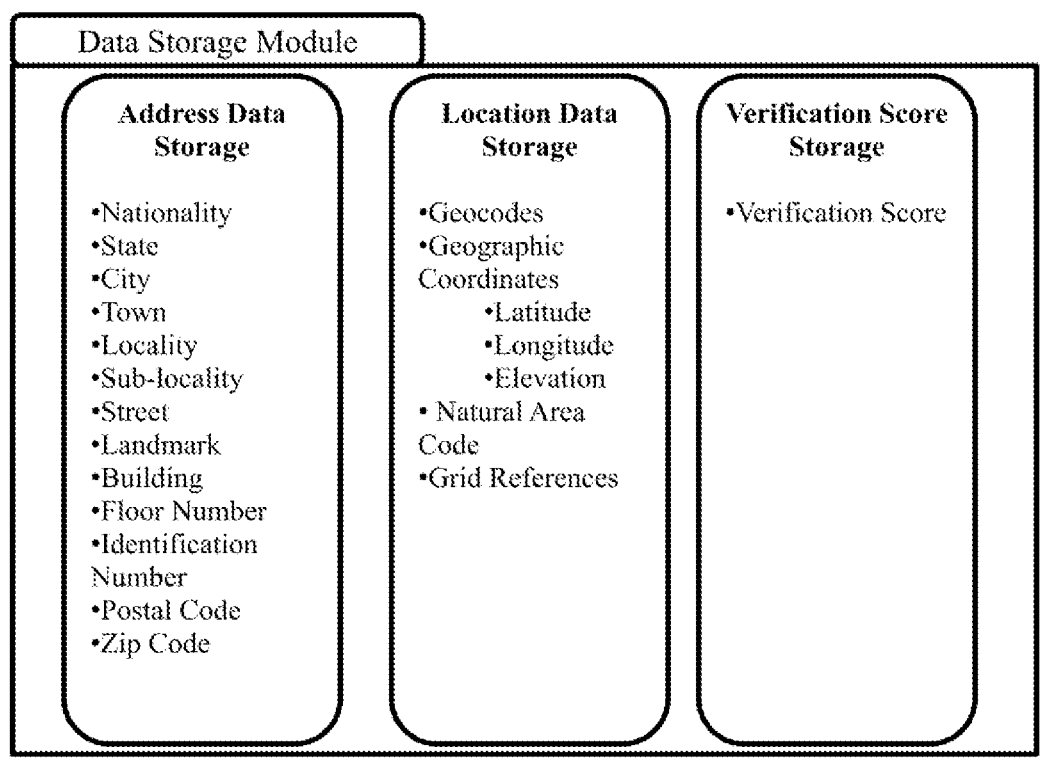
FIG. 2 illustrates a data storage module according to some embodiments of the present invention.

Referring the FIG. 2, there is shown a data storage module according to some embodiments of the present invention. The data storage module may be configured to store address data corresponding to an address of an entity. The address data may include nationality, state, city, town, locality, sub-locality, street, landmark, building, floor number, identification number, postal code, zip code or any other address identifying parameter. The data storage module may also be configured to store location data corresponding to an entity. The location data may include geocodes, geographic coordinates such as latitude, longitude or elevation, natural area code, grid references, or the like. Further, the data storage module may be configured to store verification score corresponding to a correlation between address data and location data of an entity. The verification score reflects the genuineness or trustworthiness of the correlation between address data and location data of the entity. Hence a higher verification score indicates that the location data defines the actual, physical location of the address data of the entity with high accuracy.

Figure 3:
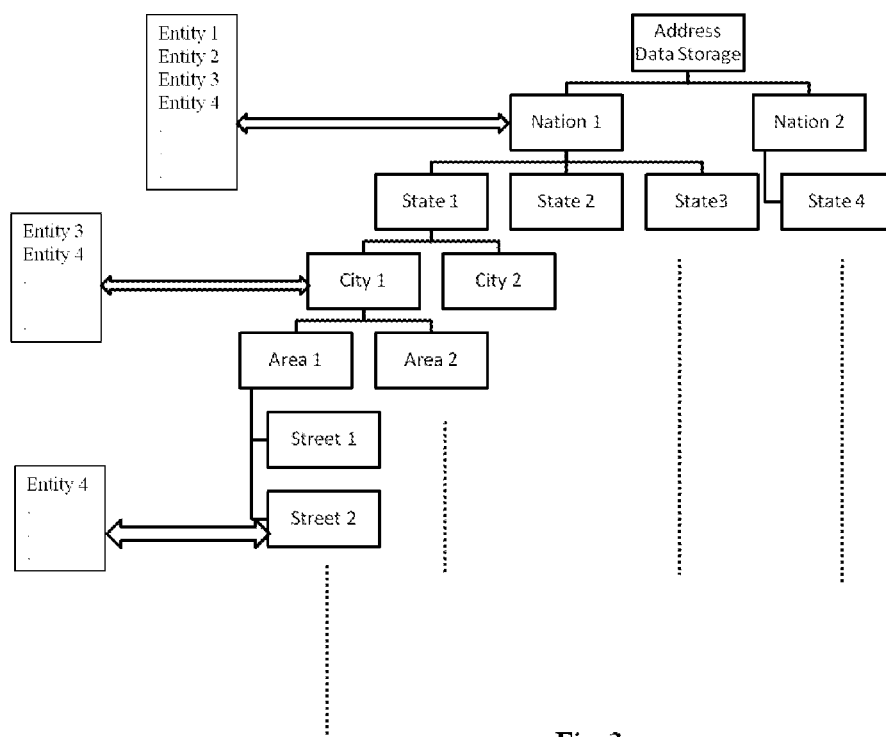
FIG. 3 illustrates a directed acyclic graph corresponding to address data stored in the data storage module according to some embodiments of the present invention.

In an embodiment of the present invention, the storage of address data of entities in the data storage module may be implemented in form of a directed acyclic graph. Referring to FIG. 3, the directed acyclic graph corresponding to address data stored in the data storage module is shown. The graph may include a plurality of hierarchical addressing blocks corresponding to at least one of: nationality, state, city, town, locality, sub-locality, street, landmark, building, floor number, identification number, postal code, zip code or any other address identifying parameter well known in the art. A first addressing block may be connected to at least one second addressing block via a parent-child relationship.

Each hierarchical addressing block may link to one or more entities whose address data map on to the hierarchical addressing block. Hence, the hierarchical addressing block named 'Delhi' shall list all the entities which have 'Delhi' as city in their address data. Similarly, the hierarchical addressing block named 'Janpath' shall list all the entities which have 'Janpath' as street name in their address data.

Referring now to FIG. 4, there is shown an address-location verifying system, according to one embodiment of the present invention.

A first address data and a first location data of a first entity is selected by processing module in accordance with the instructions stored in memory module. The first address data and the first location data of the first entity may be received by the processing module in real time from a remote communication device (not shown) or it may be pre-stored in data storage module.

The processing module may identify a plurality of hierarchical addressing blocks from the first address data of the first entity. The hierarchical addressing blocks may typically be: Country1, State1, City1, Locality1, Sub-Locality1, Street1, Building1, House-Number1 and so on.

The identification of plurality of hierarchical addressing block may be performed using data processing techniques such as, but not limited to, machine learning, artificial intelligence, fuzzy learning, pattern matching or other techniques known in the art.

The processing module selects at least one addressing block from the list of the addressing blocks stored as the directed acyclic graph in the data storage module. The processing module may select the addressing block based on the plurality of addressing blocks identified from the address data of the first entity. Hence, the processing module may select the addressing block corresponding to City 1, or Locality 1 or Building 1 and so on. The processor may select the addressing block based on rules such as, but not limited to, addressing block having lower hierarchy in the directed acyclic graph, addressing block having linkage to maximum number of entities or having linkage to maximum number of entities whose verification score is more than a threshold limit or any combination thereof. The processor may also select the addressing block randomly. The selected addressing block may link to one or more entities whose address data map on to the selected addressing block. Hence, the selected addressing block may represent an area that is bounded by roads, water bodies, parks, open spaces, or any such boundaries.

The processing module may be instructed to select at least one second entity from the list of entities corresponding to the addressing block selected by the processing module. The second entity may be selected randomly, or based on rules such as, but not limited to, entity having verification score more than a threshold limit, entity which may serve as a landmark (a monument or the like) or any combination thereof.

The processing module retrieves a second location data corresponding to a location of the selected second entity from the data storage module.

The processing module calculates a correlation between the second location data corresponding to the location of the selected second entity and the first location data corresponding to the location of the first entity. The correlation may be calculated based on the proximity of the first and second location data to each other.

In an embodiment of the invention, the processing module may render a terrestrial map of at least a portion of the geographical area corresponding to at least the selected hierarchical addressing block. The map data may be generated by the processor in real time, or it may be stored in the data storage module, remote repository or the like. The map data may also be received by the processing module from external sources such as Google Maps, Open Street Maps or other third party services. Hence, if the selected hierarchical addressing block is 'Janpath', then the processing module renders a map of at least a portion 'Janpath'. The processing module may overlay the location data of the first entity and the location data of the second entity on the rendered map. The processing module may then calculate the correlation between the second location data and the first location data. The correlation may be proximity based such as, but not limited to, aerial proximity or ground proximity or the like.

The processing module may compute a verification score based on the correlation calculated between the first location data and the second location data. Hence, if the first location data and the second location data are highly correlated i.e. they are in close proximity to each other, it may suggest a highly genuine relation between the address data and the location data of the first entity. Similarly, if the first location data and the second location data are highly uncorrelated i.e. they are geographically apart from each other, it may suggest that a less genuine relation between the address data and the location data of the first entity.

The processing module may update the verification score for the first entity in the data storage module.

The processing module may repeat the above procedure by selecting a third entity, a fourth entity and so on, to calculate a highly dependable verification score.

It may be noted here that the above description is only an exemplary working of the invention. Other techniques may also be employed for selecting the second entity for calculating the correlation score and verification score. For example, the processing module may select a second entity randomly from the list of entities stored in the data storage module. Or the processing module may use text processing, pattern matching, string matching or the like to select the second entity. Hence, the above description serves only to highlight an exemplary embodiment of the present invention, which is in no way, limiting to the invention.

The disclosure is operational with numerous other general purpose or special purpose computing system environments or configurations. Examples of well known computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, and distributed computing environments that include any of the above systems or devices, and the like.

As used herein, the wording "entity" means any geographical area which may include, but not limited to, buildings, structures, monuments, landmarks, open areas such as parks, grounds, forests or water bodies etc.

We claim:

1. A system comprising:
one or more processing modules;
one or more data storage modules, operatively coupled to the one or more processing modules, wherein the one or more data storage modules are configured to store at least one of:
an address data corresponding to an address of at least one entity;
a location data corresponding to a location of at least one entity; and
a verification score corresponding to a correlation between address data and location data of at least one entity;
at least one memory module operatively coupled to the one or more processing modules, wherein the at least one memory module stores instructions which, when executed by the one or more processing modules, causes the one or more processing modules to:
select an address data corresponding to an address of a first entity and a location data corresponding to a location of the first entity;
select a second location data corresponding to a location of at least one second entity;
compute a correlation between the location data corresponding to the location of the first entity and the location data corresponding to the location of the at least one second entity; and
update a verification score based on the computed correlation between the location data of the first entity and the location data of the at least one second entity, wherein the verification score is directed to a correlation between the first entity's address data and location data.

2. The system of claim 1, wherein the location data corresponding to the location of the at least one second entity is selected from a set of location data corresponding to location of one or more entities,
wherein the one or more entities lie within a first bounded area.

3. The system of claim 1, wherein the address data corresponding to the address of the first entity and the location data corresponding to the location of the first entity is received by the processing module in real time from a remote communication device.

4. The system of claim 1, wherein the address data corresponding to an address of the at least one entity is stored in the data storage module in form of a directed acyclic graph.

5. The system of claim 4, wherein the directed acyclic graph includes a plurality of hierarchical addressing blocks corresponding to at least one of: nationality, state, city, town, locality, sub-locality, street, landmark, building, floor number, identification number, postal code, zip code or address identifying parameter.

6. The system of claim 5, wherein the one or more processing modules identifies a plurality of hierarchical addressing blocks from the first address data of the first entity.

7. The system of claim 6, wherein the one or more processing modules selects at least one addressing block from a list of addressing blocks stored as the directed acyclic graph in the data storage module based on the plurality of addressing blocks identified from the address data of the first entity.

8. The system of claim 7, wherein the one or more processing modules are further configured to:
- render a terrestrial map of at least a portion of a geographical area corresponding to at least the selected at least one addressing block; and
- overlay the location data of the first entity and the location data of the second entity on the rendered map.

9. A method of validating accuracy of location data for an address data of a first entity, the method comprising:
- selecting an address data corresponding to an address of a first entity and a location data corresponding to a location of the first entity;
- selecting a location data corresponding to a location of a second entity;
- computing a correlation between the location data corresponding to the location of the first entity and the location data corresponding to the location of the second entity; and
- updating a verification score based on the computed correlation between the location data of the first entity and the location data of the second entity, wherein the verification store is directed to a correlation between the address data and location data of the first entity.

10. A method of validating accuracy of location data for an address data of a first entity, the method comprising:
- identifying a plurality of hierarchical addressing blocks from the address data of the first entity:
- selecting, from a list of hierarchical addressing blocks, at least one hierarchical addressing block corresponding to the identified plurality of hierarchical addressing blocks;
- selecting a second entity from a list of entities corresponding to the selected at least one hierarchical block;
- determining a correlation between a location data of the first entity and a location data of the second entity; and
- generating a verification score based on the determined correlation between the location data of the first entity and the location data of the second entity, wherein the verification score is directed to a correlation between the address data and the location data of the first entity.

* * * * *